(12) United States Patent
Zhou et al.

(10) Patent No.: US 11,747,818 B2
(45) Date of Patent: Sep. 5, 2023

(54) SPEED PLANNING METHOD AND APPARATUS AND CALCULATING APPARATUS FOR AUTOMATIC DRIVING OF VEHICLE

(71) Applicant: UISEE TECHNOLOGIES (BEIJING) LTD, Beijing (CN)

(72) Inventors: Xiaocheng Zhou, Beijing (CN); Yan Jiang, Beijing (CN); Jinzhan Peng, Beijing (CN); Xin Zhou, Beijing (CN); Dan Zhang, Beijing (CN); Sai Luo, Beijing (CN)

(73) Assignee: UISEE TECHNOLOGIES (BEIJING) LTD, Beijing (CN)

( * ) Notice: Subject to any disclaimer, the term of this patent is extended or adjusted under 35 U.S.C. 154(b) by 92 days.

(21) Appl. No.: 16/735,960

(22) Filed: Jan. 7, 2020

(65) Prior Publication Data

US 2020/0218275 A1   Jul. 9, 2020

Related U.S. Application Data

(63) Continuation of application No. 16/308,353, filed as application No. PCT/CN2016/085310 on Jun. 8, 2016, now Pat. No. 10,564,644.

(51) Int. Cl.
*G05D 1/02* (2020.01)
*G06F 16/22* (2019.01)
(Continued)

(52) U.S. Cl.
CPC ........... *G05D 1/0221* (2013.01); *B60W 30/00* (2013.01); *G05D 1/0088* (2013.01);
(Continued)

(58) Field of Classification Search
CPC .. G05D 1/0221; G05D 1/0223; G05D 1/0088; B60W 30/18; B60W 30/18009; B60W 30/14; B60W 30/143; B60W 30/146; B60W 30/16; B60W 30/162; G05N 20/00; G05B 13/04; G05B 13/041;
(Continued)

(56) References Cited

U.S. PATENT DOCUMENTS 10,026,506 B1 *  7/2018  LaBorde ............... G05D 1/0088
2007/0156294 A1 *  7/2007  Tipping ................. G09B 23/06
                                                              701/1

(Continued)

*Primary Examiner* — Russell Frejd
*Assistant Examiner* — Sara J Lewandroski
(74) *Attorney, Agent, or Firm* — MagStone Law, LLP; Enshan Hong (57) ABSTRACT

A speed planning method and apparatus and a calculating apparatus for automatic driving of a vehicle. The method comprises: using a training sample set to perform machine learning to obtain a machine learning model; partitioning an input space, and obtaining a decision result corresponding to a determined partition based on the obtained machine learning model to form a partition decision table of each partition corresponding to the corresponding decision result; and obtaining each dimensional feature vector of a vehicle while driving in real time as an input feature, determining an input partition to which the input feature belongs, and querying the partition decision table based on the determined partition to obtain the corresponding decision result.

20 Claims, 8 Drawing Sheets

(51) Int. Cl.
  *G06N 20/00* (2019.01)
  *G05D 1/00* (2006.01)
  *B60W 30/00* (2006.01)
(52) U.S. Cl.
  CPC ....... *G05D 1/0223* (2013.01); *G06F 16/2282* (2019.01); *G06N 20/00* (2019.01); *G05D 2201/0213* (2013.01)
(58) Field of Classification Search
  CPC ... G05B 13/042; G06F 20/22; G06F 20/2228; G06F 20/2237; G06F 20/2255; G06F 20/2264; G06F 20/2272; G06F 20/2282; G06F 20/2291; G06F 20/23; G06F 20/2379; G06F 20/24; G06F 20/24554; G06F 20/28; G06F 20/283; G06F 20/284; G06F 18/2163
  See application file for complete search history.

(56) References Cited

U.S. PATENT DOCUMENTS

| | | | |
|---|---|---|---|
| 2009/0306866 A1* | 12/2009 | Malikopoulos ... | B60W 30/1882 701/59 |
| 2012/0005141 A1* | 1/2012 | Sasagawa ............. | G06N 3/063 706/25 |
| 2014/0277835 A1* | 9/2014 | Filev ....................... | G06F 17/00 701/2 |
| 2015/0046060 A1* | 2/2015 | Nikovski ............. | B60R 16/037 701/99 |
| 2016/0026182 A1* | 1/2016 | Boroditsky ............. | H04L 67/10 701/23 |
| 2017/0124407 A1* | 5/2017 | Micks ................ | G06K 9/00604 |

\* cited by examiner

SPEED PLANNING METHOD AND APPARATUS AND CALCULATING APPARATUS FOR AUTOMATIC DRIVING OF VEHICLE

CROSS-REFERENCE TO RELATED APPLICATIONS

This application is a continuation application of U.S. patent application Ser. No. 16/308,353, filed on Dec. 7, 2018, which is a national phase application of International Application No. PCT/CN2016/085310, filed on Jun. 8, 2016, each of which is hereby incorporated by reference in its entirety.

TECHNICAL FIELD

The present disclosure relates to the field of vehicle control, in particular to a speed planning method and apparatus and a calculating apparatus for automatic driving of a vehicle.

BACKGROUND

With the development of vehicle technology, automatic driving of vehicles has become a hot research field. Speed planning and control is an important research subject in automatic driving, the primary goal of which is to plan an estimated speed of a vehicle at a series of subsequent time instants according to a detected state (e.g., a current speed, a speed of a front vehicle, and a distance from a front vehicle), and to calculate final control parameters (e.g., an accelerator and a break) of the vehicle to actually control the vehicle. Speed planning needs to ensure absolute safety of passengers when other vehicles have unexpected behaviors (e.g., sudden braking) while ensuring the basic comfort and safety of the passengers.

To deal with various possible situations, it needs to design a complex speed planning and control model. Some rare circumstances and factors are very likely to be left out in manual design and implementation. At the same time, very rich and mature driving data can be acquired from a vehicle driven by a driver. Since a machine learning method can easily learn a model from the data, the machine learning method is increasingly applied to the speed planning and control. In addition, in the real world, different drivers have different driving habits and definitions of safety and comfort. Therefore, if the same planning and control method is used, it is difficult to meet various different needs, while the machine learning method can well adapt to personalized driving habits.

SUMMARY

Through long-term research, the inventors of the present disclosure have recognized that the application of machine learning to speed planning for vehicles suffers from several disadvantages.

First, the effectiveness of the model learned through the machine learning method is directly related to the training data. Since a driver typically drives in a very comfortable range, it is difficult to collect training data that cover all possible scenarios (e.g., extreme situations such as extremely high speed and a very short distance from the front vehicle). Although the problem can be solved by the technologies of generalization and the like, it cannot be solved entirely. Also, the collected driver's behaviors may not fully meet the requirements for comfort and safety. For example, some drivers cannot ensure the distance from the front vehicle. Therefore, when the front vehicle suddenly brakes, the driven vehicle can hardly guarantee completely braking without colliding with the front vehicle. Obviously, the model trained using such data cannot handle this situation as well.

Another problem with machine learning is that it is difficult to locally adjust the model trained in this way. Applications of planning and control to automatic driving may often require the model to be locally adjusted for a particular situation. For the model obtained by machine learning, the adjustment of each parameter learned may bring about overall uncontrollable influence. The model can also be modified by adding more training samples, but such a method has a longer period and the model finally trained is not fully predictable.

The object of the present disclosure is to overcome the disadvantages and shortcomings in the prior solutions and to propose a new speed planning method and apparatus and a calculating apparatus for automatic driving of a vehicle.

According to an aspect of the present disclosure, a speed planning method for automatic driving of a vehicle is provided, the method including:

first, a machine learning step, comprising: performing machine learning using a set of training samples to obtain a machine learning model, wherein each of the training samples is represented by a multi-dimensional feature vector forming an input space and a decision result forming an output space, wherein each dimension of the multi-dimensional feature vector comprises a variable representative of a state of the vehicle at a particular moment, wherein the variable is related to speed planning, and wherein the decision result indicates an expected speed at a next moment and/or a control parameter value related to speed control;

second, a partition decision table obtaining step, comprising: dividing the input space into partitions, and obtaining a decision result corresponding to a respective partition of the partitions based on the obtained machine learning model to form a partition decision table that maps each of the partitions to its corresponding decision result; and Further, a real-time decision-making step, comprising: obtaining each dimensional feature vector of a driving vehicle in real time as an input feature, determining an input partition to which the input feature belongs, and querying the partition decision table based on the determined input partition to obtain a corresponding decision result.

Further, the speed planning method may further include a real-time control step, comprising issuing a control command to the vehicle based on the obtained decision result, thereby controlling the speed of the vehicle.

Further, in the real-time control step, when the decision result of the determined partition is determined as not conforming to an expectation, the partition decision result of the partition can be adjusted.

Further, the partition decision result of the partition can be adjusted based on experience, or by learning the partition with a machine learning method.

Further, each dimensional feature vector may include a current speed, a distance from a front vehicle, a relative speed with respect to the front vehicle and a maximum speed.

Further, a feature space may be coded using discrete coding before the machine learning step.

Further, according to the speed planning method of embodiments of the present disclosure, the discrete coding method may be tiling coding, in which each feature vector may be coded using tiling coding having one tiling, and the dimension in which each feature vector is located is divided into preferred 7-13 intervals to partition the input space.

Further, in the partition decision table obtaining step, a size of a space corresponding to the discrete coding result obtained by the discrete coding method may be calculated first. When the size of the space is greater than a determined threshold, a dynamic storage method is used to store the partition decision table, wherein only the input of the training space is traversed, wherein the output result of a corresponding decision model is stored, and wherein the trained decision model is stored for backup in addition to the partition decision table. When the size of the space is smaller than the determined threshold, a static storage method is used to store the partition decision table, wherein all code spaces are traversed, and wherein the output result of the decision model is stored.

Further, in the real-time decision-making step, discrete coding is first performed on the input feature using the discrete coding method to obtain a discrete coding result. The obtained discrete coding result is then used as an index of the partition decision table. When the partition decision table is stored using the static storage method, the decision result stored in the partition decision table may be directly obtained.

Further, in the real-time decision-making step, discrete coding is first performed on the input feature using the discrete coding method, the obtained discrete coding result is then used as an index of the partition decision table. When the partition decision table is stored using the dynamic storage method, if the decision result of the discrete coding result is stored in the partition decision table, the decision result may be directly obtained from the partition decision table. If the decision result of the discrete coding result is not stored in the partition decision table, the stored decision model is used to obtain a decision result, and the obtained decision result is added to the partition decision table.

Further, the machine learning method may be a supervised learning method, an unsupervised learning method, or a reinforcement learning method.

Further, when discrete coding is performed on the feature space, two inputs may be regarded as belonging to the same partition as long as the final discrete codes of the two inputs are identical.

Further, the discrete coding method may include various coarse coding methods, such as tile coding.

Further, in the real-time control step, the number of partitions of which the partition decision results are adjusted needs to be determined after the partition decision result of the partition is adjusted, and when the number of partitions exceeds a predetermined threshold, the machine learning step and the partition decision table obtaining step should be re-executed.

According to another aspect of the present disclosure, a speed planning apparatus for automatic driving of a vehicle is provided, the apparatus including a machine learning unit, a partition decision table obtaining unit, and a real-time decision-making unit. Optionally, the speed planning apparatus may further include a real-time control unit.

The machine learning unit may be configured to perform machine learning using a set of training samples to obtain a machine learning model, wherein each of the training samples may be represented by a multi-dimensional feature vector forming an input space and a decision result forming an output space, wherein each dimension of the multi-dimensional feature vector is a variable that can be used to describe a state of the vehicle at a particular moment and related to speed planning, and wherein the decision result may indicate an expected speed at a next moment and/or a control parameter value related to speed control.

The partition decision table obtaining unit is configured to partition the input space, and obtain a decision result corresponding to a determined partition based on the obtained machine learning model to form a partition decision table that maps each partition to its corresponding decision result.

The real-time decision-making unit is configured to obtain each dimensional feature vector of a driving vehicle in real time as an input feature, determine an input partition to which the input feature belongs, and query the partition decision table based on the determined partition to obtain a corresponding decision result.

The real-time control unit is configured to issue a control command to the vehicle based on the obtained decision result, thereby controlling the speed of the vehicle.

Further, the real-time control unit is further configured to adjust the partition decision result of the partition in the real-time control step when the decision result of the determined partition is determined as not conforming to an expectation.

Further, the partition decision table obtaining unit is further configured to adjust the partition decision result of the partition based on experience, or by learning the partition using a machine learning method.

Further, the real-time decision-making unit is further configured such that each dimensional feature vector may include a current speed, a distance from a front vehicle, a relative speed with respect to the front vehicle and a maximum speed.

Further, the speed planning apparatus for automatic driving of a vehicle according to the present disclosure further includes a discrete coding unit configured to perform discrete coding on the training samples and the input feature at the real-time decision stage.

Further, according to the speed planning apparatus of the embodiment of the present disclosure, the discrete coding method used by the discrete coding unit is tiling coding, in which each feature vector is coded with tiling coding having only one tiling, and the dimension in which each feature vector is located is divided into 7-13 intervals to partition the input space.

Further, the partition decision table obtaining unit is configured to calculate a size of a space of the discrete coding result obtained by the discrete coding method; when the size of the space is greater than a determined threshold, a dynamic storage method is used to store the partition decision table, wherein only the input of the training space is traversed, wherein the output result of the corresponding decision model is stored, and the trained decision model is also stored for backup; and when the space is smaller than the determined threshold, a static storage method is used to store the partition decision table, wherein all code spaces are traversed, and wherein the output result of the decision model is stored.

Further, the real-time decision-making unit is configured to perform discrete coding on the input feature using a discrete coding method, use the obtained discrete coding result as an index of the partition decision table, and when the partition decision table is stored using the static storage method, directly obtain the decision result stored in the partition decision table.

Further, the real-time decision-making unit is configured to perform discrete coding on the input feature using the discrete coding method, use the obtained discrete coding result as an index of the partition decision table, and when the partition decision table is stored using the dynamic storage method, if the decision result of the discrete coding result is stored in the partition decision table, directly obtain the decision result from the partition decision table; and if the decision result of the discrete coding result is not stored in the partition decision table, use the stored decision model to obtain a decision result, and add the obtained decision result to the partition decision table.

Further, the machine learning method may be a supervised learning method, an unsupervised learning method, or a reinforcement learning method.

Further, the partition decision table obtaining unit is configured such that two inputs belong to the same partition as long as the final discrete codes of the two inputs are identical.

Further, the discrete coding method may include various coarse coding methods, such as tile coding.

Further, a feedback unit is configured to determine the number of partitions of which the partition decision results are adjusted, and trigger the machine learning unit and the partition decision table obtaining unit to perform the machine learning operation and the partition decision table obtaining operation again when the number of the partitions exceeds a predetermined threshold.

According to another aspect of the present disclosure, provided is a calculating apparatus for speed planning of automatic driving of a vehicle, including a storage component and a processor, wherein the storage component stores a computer executable instruction set, and when the computer executable instruction set is executed by the processor, the following steps are performed: a machine learning step, comprising: performing machine learning using a set of training samples to obtain a machine learning model, each of the training samples being represented by a multi-dimensional feature vector forming an input space and a decision result forming an output space, each dimension of the multi-dimensional feature vector being a variable that can be used to describe a state of the vehicle at a particular moment and related to speed planning, and the decision result indicating an expected speed at next moment and/or a control parameter value related to speed control; a partition decision table obtaining step, comprising: partitioning the input space, and obtaining a decision result corresponding to a determined partition based on the obtained machine learning model to form a partition decision table that maps each partition to its corresponding decision result; a real-time decision-making step, comprising: obtaining each dimensional feature vector of the vehicle while driving in real time as an input feature, determining an input partition to which the input feature belongs, and querying the partition decision table based on the determined partition to obtain the corresponding decision result; and a real-time control step, issuing a control command to the vehicle based on the obtained decision result, thereby controlling the speed of the vehicle.

The speed planning method and apparatus and the calculating apparatus provided in the present disclosure use the partition decision table technology that are suitable for the automatic driving technology for vehicles, and thus effectively solve the problem that a model trained by means of machine learning cannot be locally adjusted, and can easily modify the decision of a certain partition without affecting the decision results of other partitions at all so as to accomplish local adjustment. The intuitive nature of the partition decision table can effectively help to find and solve the problems in the machine learning process. The partition decision table can speed up the decision process, and querying the partition decision table can obtain a higher decision making speed.

BRIEF DESCRIPTION OF THE DRAWINGS

These and/or other aspects and advantages of the present disclosure will become clearer and be understood more easily from the following detailed description of the embodiments of the present disclosure in combination with the accompanying drawings, in which.

DETAILED DESCRIPTION OF THE EMBODIMENTS

In order that those skilled in the art better understand the present disclosure, the present disclosure will be further described in detail below in combination with the accompanying drawings and specific embodiments.

Before the detailed description, the general idea of the present disclosure will be introduced first, so that those skilled in the art can grasp the present disclosure.

As mentioned above, the inventors discovered by implementation and analysis that machine learning relied heavily on training data. The limitation of the training data may result in several issues, such as that the trained model cannot handle some actual emergencies, that local slight adjustment is difficult to implement, and that the overall adjustment period is long and the effects are unpredictable. To address these issues, the inventors proposed to train machine learning models and apply the trained machine learning models in respective processes. During the training of the machine learning models, we use a typical machine learning method for training. Before the application of these trained machine learning, the input space is divided into multiple partitions, and the decision results in the models are stored in different partitions to form a partition decision table organized by partition. Thus, the decision-making process of applying the models is transformed into a process of querying the partition decision table. As such, the decision of a partition can be modified easily without affecting the decision results of other partitions at all, thus accomplishing local adjustment.

Meanwhile, the intuitive nature of the partition decision table can effectively help to find and solve problems presented in the machine learning process. The partition decision table can speed up the decision-making process, and querying the partition decision table can obtain a higher decision making speed. For automatic driving speed planning with high real-time requirements, it is important to adjust a local strategy easily and have a high decision making speed.

Figure 1:
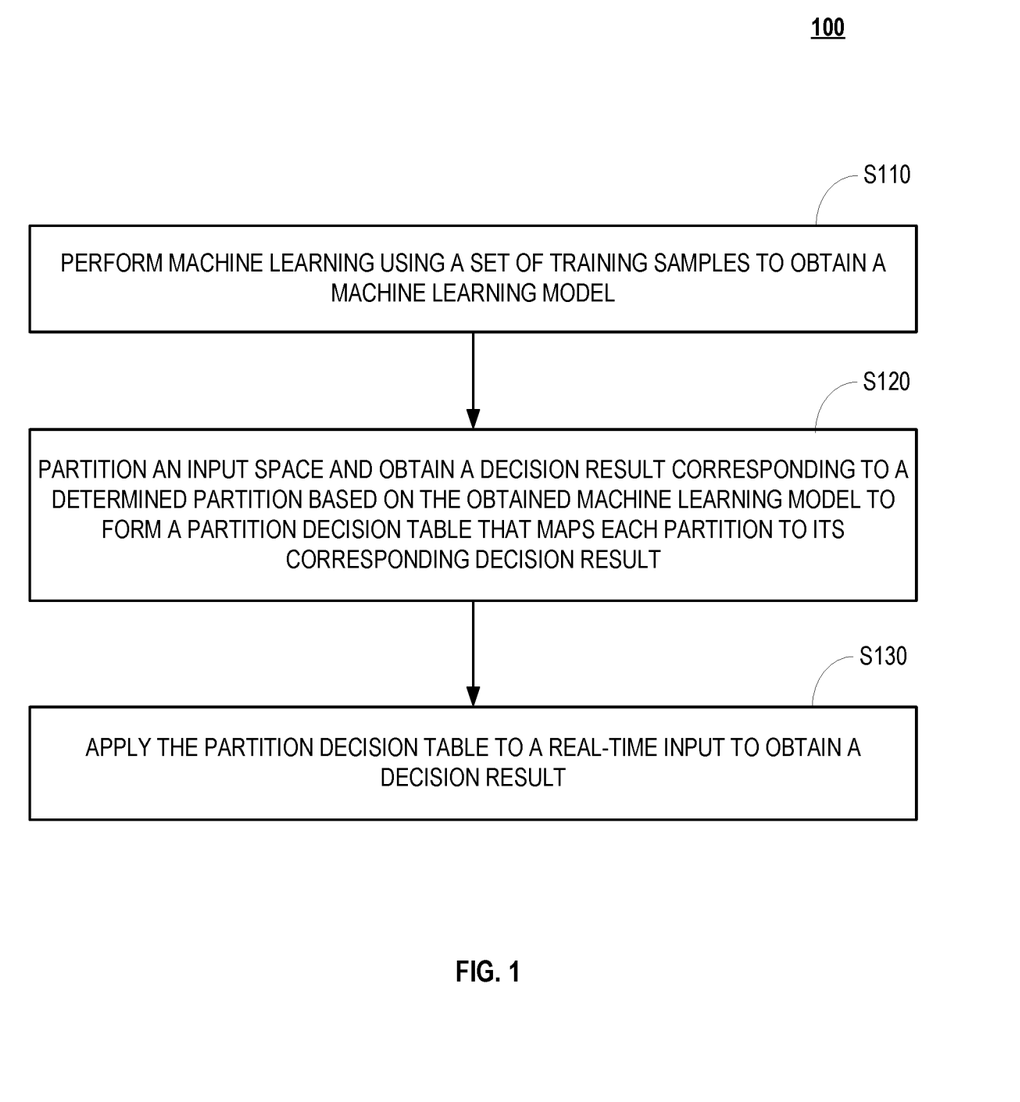
FIG. 1 is a generalized flowchart of a speed planning method for automatic driving of a vehicle according to an embodiment of the present disclosure.

An example of an automatic vehicle driving method according to an embodiment of the present disclosure will be described below in connection with FIG. 1. FIG. 1 shows a generalized flowchart of a speed planning method for automatic driving of a vehicle according to an embodiment of the present disclosure.

In step S110, a machine learning step is performed. The machine learning is performed using a set of training samples to obtain one or more machine learning models. Each of the training samples may be represented by a multi-dimensional feature vector forming an input space and a decision result forming an output space. Each dimension of the multi-dimensional feature vector may be a variable representative of a state of the vehicle at a particular moment. The variable may be related to speed planning. The decision result may indicate an expected speed at a next time instance and/or a value of a control parameter related to speed control. After step S110, step S120 is performed.

In step S120, a partition decision table obtaining step is performed. The input space is divided into a plurality of partitions. Decision results corresponding to the partitions are obtained based on the obtained machine learning model(s). A partition decision table is constructed. The partition decision table may map each of the partitions to its corresponding decision result.

In step S130, a real-time decision is made. Each dimensional feature vector of a driving vehicle is obtained in real time as an input feature. An input partition to which the input feature belongs is determined. A corresponding decision result is obtained by querying the partition decision table based on the determined input partition.

In some embodiments of the present disclosure, the training and application of the machine learning model(s) are processed respectively. During the training of the machine learning model, models are trained according to general training cases collected in advance. The specific machine learning method may be supervised learning that requires data annotation, unsupervised learning that does not require data annotation, reinforcement learning, etc. In contrast to the conventional techniques, before application of these trained models, the input space is divided into multiple partitions according to a discrete coding method during the training. Also the decision results in the models are stored in different partitions to form a partition-organized decision table. Therefore, the speed planning method for automatic driving of a vehicle according to embodiments of the present disclosure converts a decision-making process by application of models into a process of querying the partition decision table.

Figure 2:
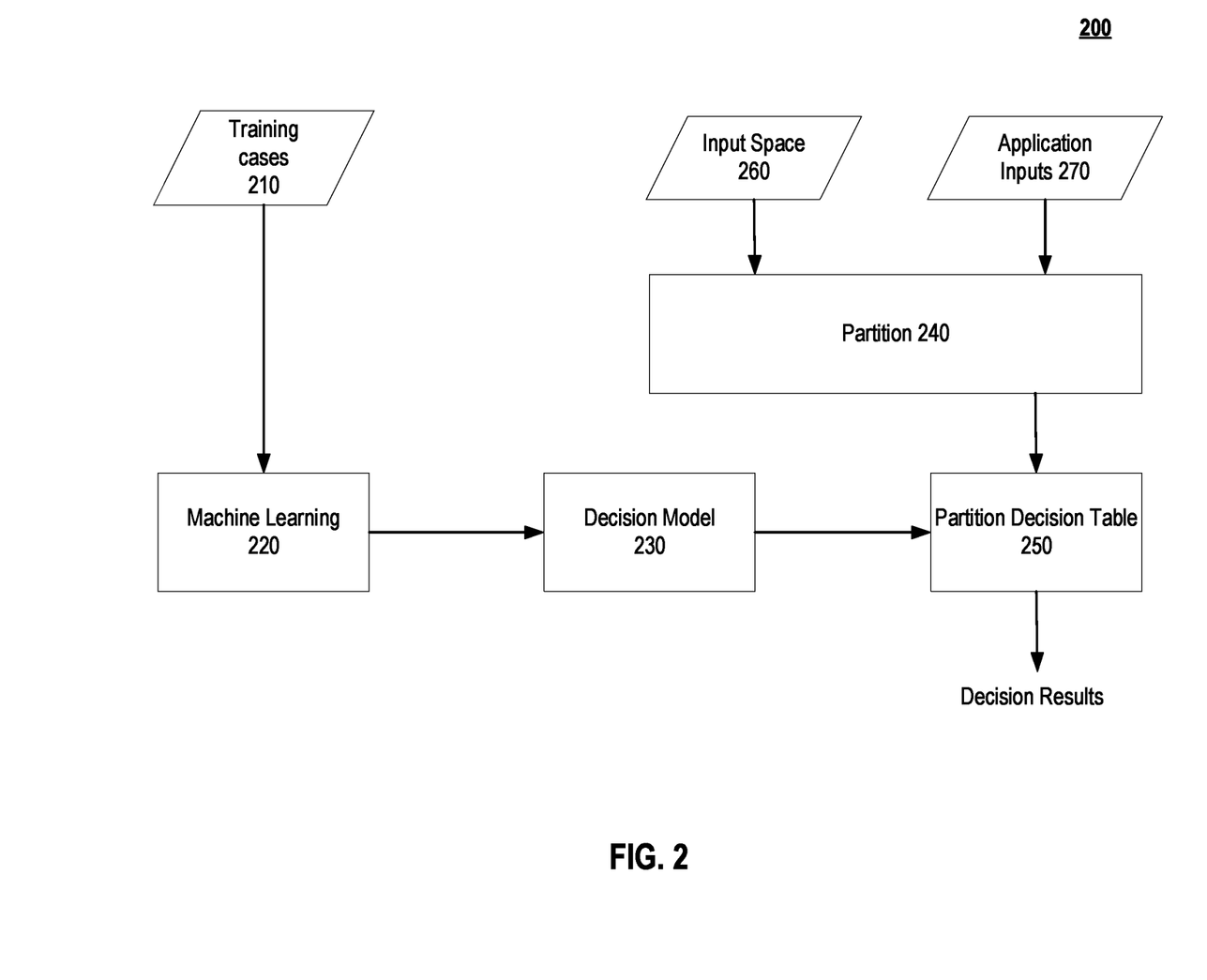
FIG. 2 is an example diagram schematically showing an operation process, and input and output of machine learning training and application.

For ease of understanding, FIG. 2 schematically illustrates an example diagram of an operation process, including input and output of machine learning training and application.

As shown in FIG. 2, machine learning 220 is performed on each of input training cases (training samples) 210 to obtain a decision model 230. An input space 240 is divided into partitions. A partition decision table 250 is obtained based on the partitions and the decision model.

When a decision is made using the partition decision table, a received input 270 is first partitioned 240. A partition to which the received input belongs is determined. The partition decision table 250 is then queried to obtain a corresponding decision result. As an example of partitioning, a partition of continuous dimensions, for example, can be divided based on empirical knowledge of vehicle control experts.

Figure 3:
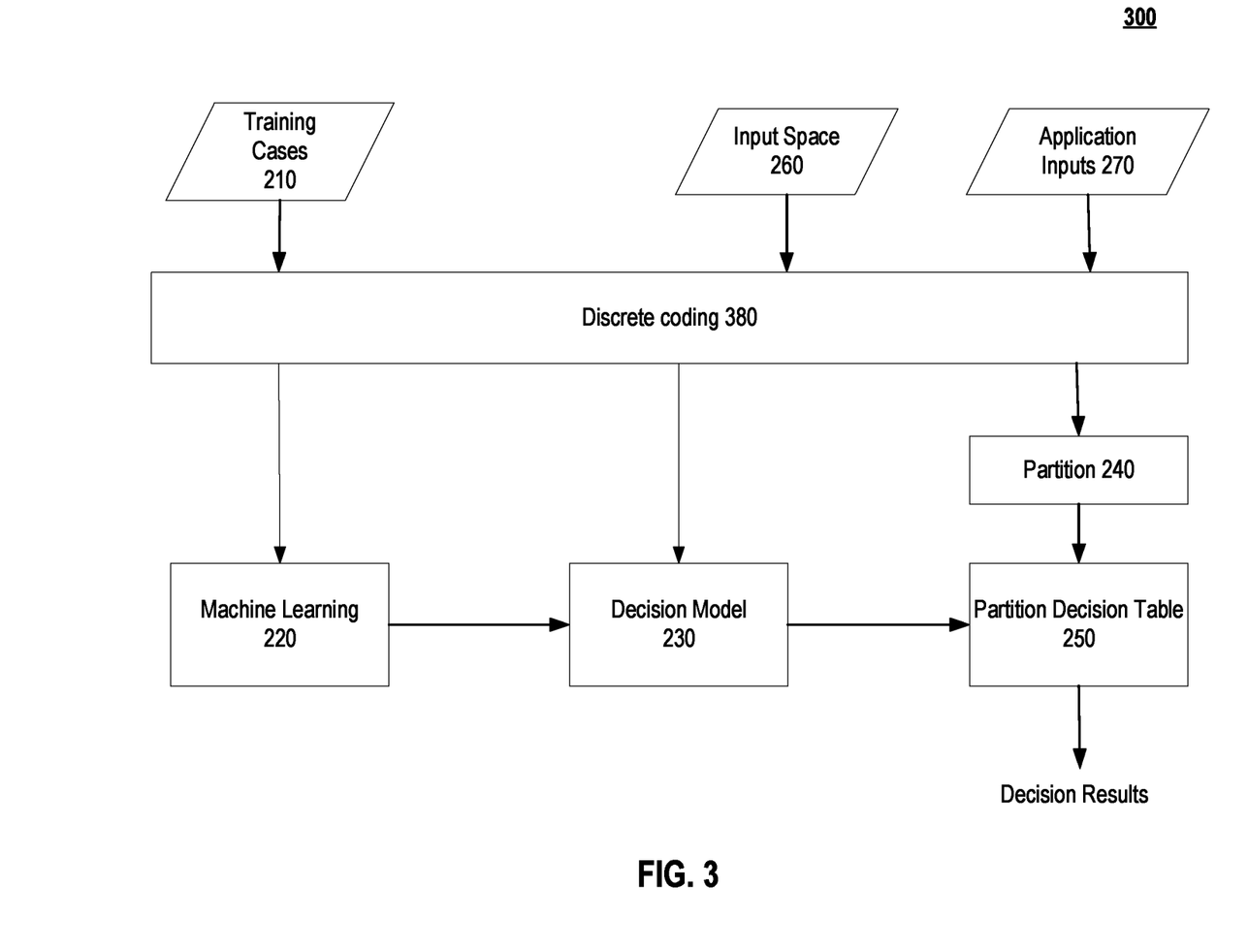
FIG. 3 is an exemplary diagram of an operation process, input and output of machine learning training and application processed by discrete coding before a machine learning method is applied.

As an example, prior to applying the machine learning method, the input space may be discretized using a coding method to extract features for processing. The discrete coding method naturally divides the continuous input space into multiple partitions. A partition as referred to herein is not limited to a partition of a continuous space of the same dimensional data. Two samples may be regarded as belonging to the same partition when the samples may be encoded into the same coded data. In other words, the partitions referred to herein are not necessarily continuously divided according to the original space. Rather, the partitions may be divided according to results of discrete coding. FIG. 3 shows a schematic diagram of a process, input and output of machine learning training and application processed by discrete coding before a machine learning method is applied, wherein an input, such as a training example or an application example, is processed by discrete coding 380.

Figure 4:
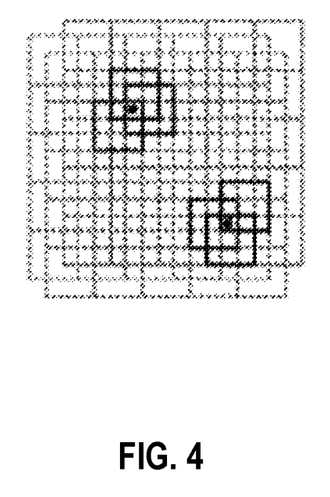
FIG. 4 shows a tile coding discrete coding method in the coarse coding category.

FIG. 4 shows a tile coding as an example of a discrete coding method, which is a form of coarse coding. In a two-dimensional input space as shown in FIG. 4, three tilings at different positions divide the entire input space into different sub-areas. These sub-areas can be used as partitions.

As an example, the input space may comprise four dimensions corresponding to a current speed, a distance from a front vehicle, a relative speed with respect to the front vehicle, and a maximum speed, respectively. It should be noted that the front vehicle as referred to herein is a broad concept and is not limited to a vehicle. When there is no object in front, the front vehicle can be virtual, and a distance and a relative speed from the virtual front vehicle may be set. The maximum speed may be the highest driving speed under various condition limitations (such as road limitations, weather condition limitations, etc.). Therefore, the code space for speed planning and control in the field of automatic driving is usually small, and is thus more suitable for partitioning.

An example in accordance with an implementation proposed by the inventors comprises: coding each dimension of the input using tiling coding having one tiling, and dividing each dimension of the input into about 10 partitions. This may well meet the speed decision requirements of automatic driving. For example, a dimension of the input corresponding to the maximum speed may be partitioned, based on a partition size of 10 km/h and/or actual situations, into 12 partitions including [0, 10, 20, 30, 40, 50, 60, 70, 80, 90, 100, 110, 120]. The number of the partitions at this time may be about $10^4$. It is easy to store and process a partition table of such size by a computer. In some extreme cases (e.g., a large number of input dimensions or a large discrete code output space), the final code space may exceed the storage capacity of the computer. In such cases, actual inputs from the real world may be very sparse. As a result, the partition decision table can be dynamically stored and processed using a hash table or other methods that save storage space.

Figure 5:
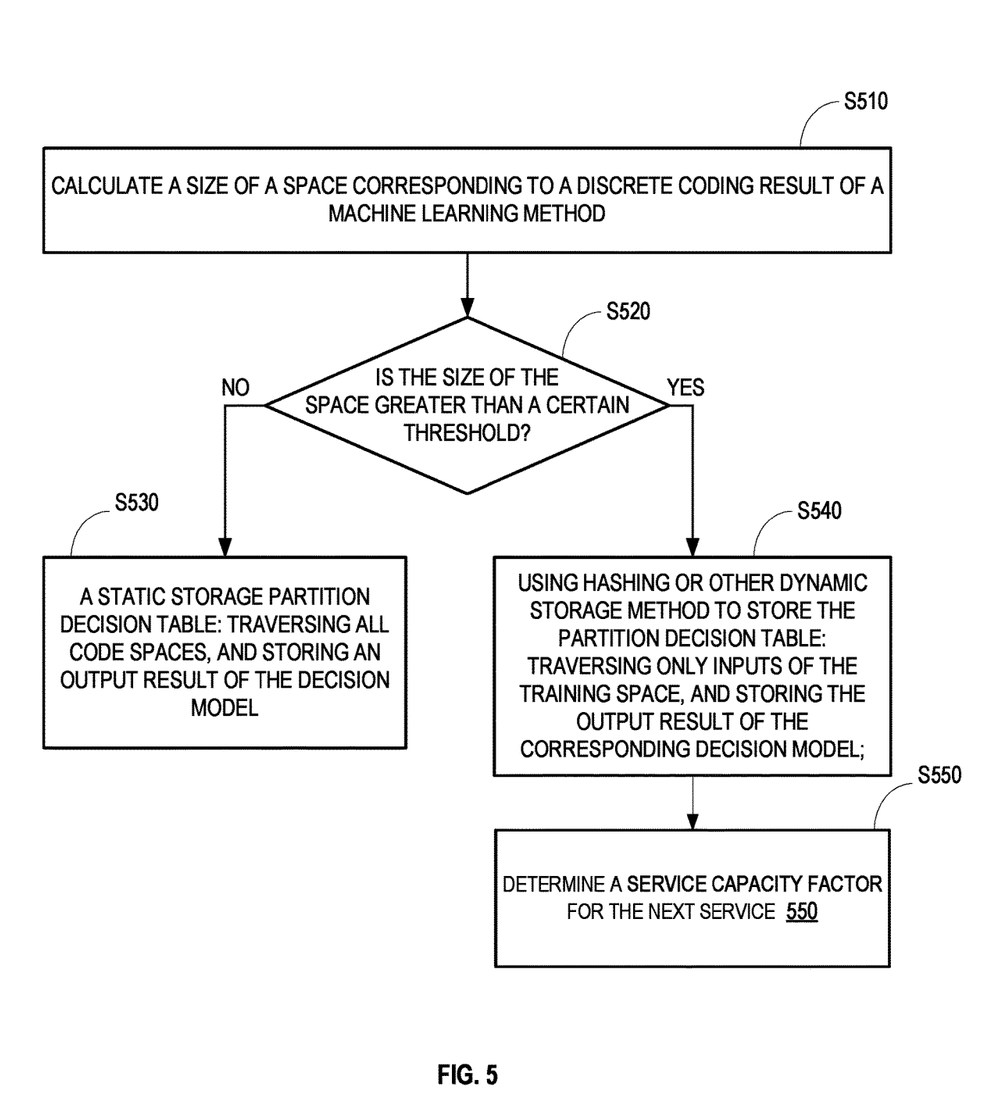
FIG. 5 shows an establishment and optimization process of an entire decision partition table in the case of discrete coding according to an embodiment of the present disclosure.

A process of constructing and optimizing an entire decision partition table in the case of discrete coding according to an embodiment of the present disclosure will be described below with reference to FIG. 5. This process can be used to perform step S120 shown in FIG. 1. It should be noted that the threshold in FIG. 5 may be set according to the storage space of a machine. It should be noted that this is only an example, and that discrete coding does not have to be performed on the training samples before machine learning training. As shown in FIG. 5, in step S510, a size of a space of a discrete coding result of the machine learning method is calculated.

In step S520, whether the space size is greater than a threshold is determined. When the result of the determination in step S520 is negative, the process may proceed to step S530, wherein the partition decision table is statically stored. All code spaces are traversed. The output result of the decision model is stored. Alternatively, when the result of the determination is positive, the process may proceed to step S540, where the partition decision table may be stored using hash tables or any other dynamic storage method. The input of the training space is traversed. The output result of the corresponding decision model is stored. Next, the process may proceed to step S550, where the trained decision model may be stored for backup in addition to the partition decision table. It needs to be noted that, when the partition decision table is dynamically stored, an entry corresponding to the training set can be added in advance to reduce the overhead of dynamic table construction in subsequent dynamic applications. Entries corresponding to other input sets may also be added, or no entry is added, but an entry is dynamically added when needed later. At this time, since decision entries are required to be dynamically interpolated later, the decision model obtained by machine learning is also required to be stored in addition to the initial partition decision table, as shown in step S550.

Figure 6:
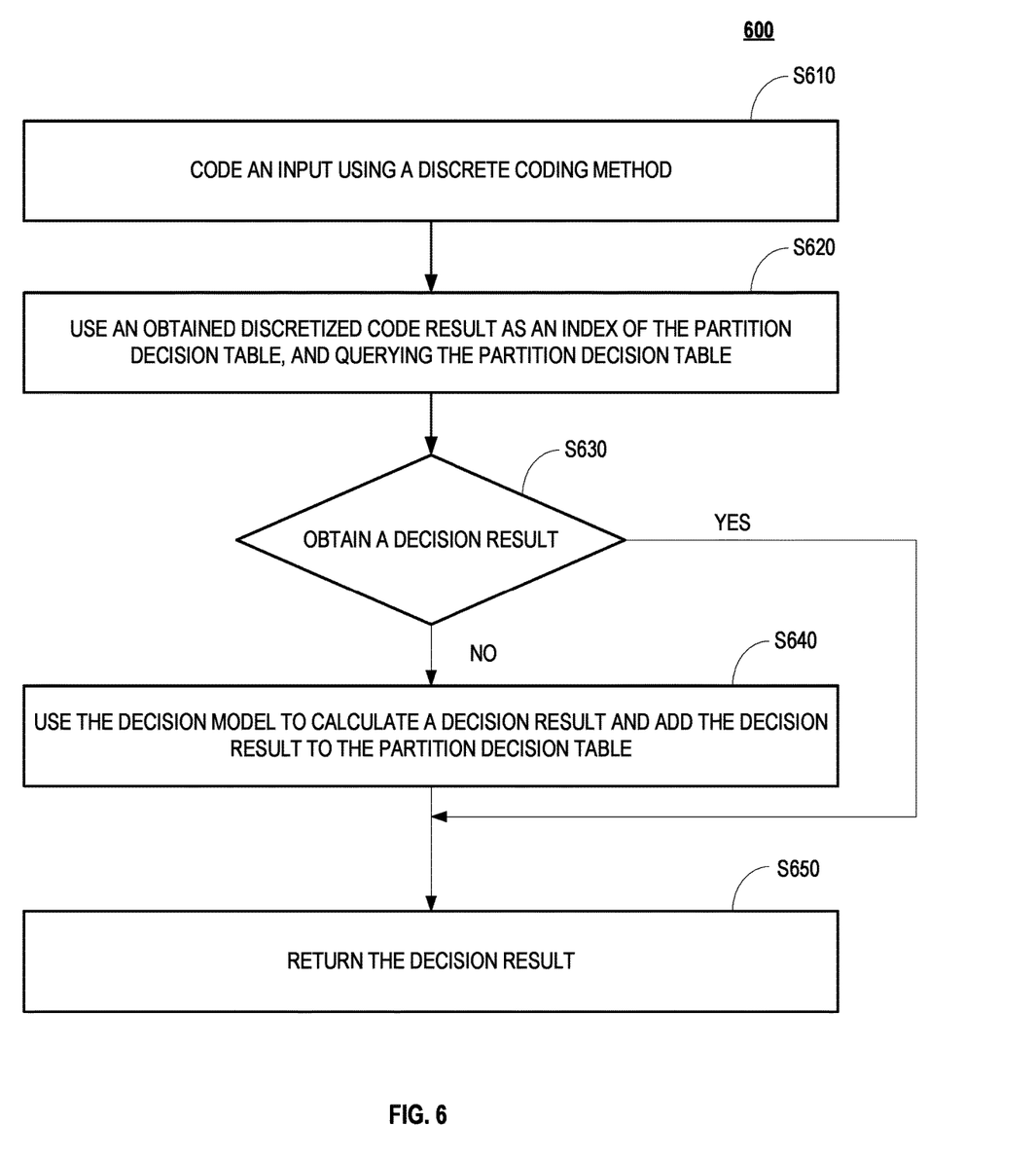
FIG. 6 shows a flowchart of a method of implementing a real-time decision-making step according to an embodiment of the present disclosure.

An example process for performing the real-time decision-making step S130 according to an embodiment of the present disclosure will be described below with reference to FIG. 6. It may be assumed here that the input is processed by the discrete coding method, and that the partition decision table is constructed and stored by the method shown in FIG. 5. As shown in FIG. 6, in step S610, an input is coded using a discrete coding method. The input here may be a current speed, a distance from a front vehicle, a relative speed with respect to the front vehicle, and a maximum speed obtained in real time during the automatic driving process of the vehicle. However, these are only examples, and the input dimensions and specific features may vary according to the speed planning method.

In step S620, a result of the discrete coding is used as an index of the partition, and the partition decision table is queried.

When the partition decision table is stored using the static storage method or stored using the dynamic storage method but stores the decision result of the discrete coding result, the decision result can be directly obtained from the partition decision table. Otherwise, when the partition decision table is stored using the dynamic storage method and does not store the decision result of the discrete coding result, the decision result cannot be directly obtained from the partition decision table.

In step S630, whether a decision result may be obtained is determined. If the answer is "Yes", the process may proceed to step S650 and may return the decision result. Alternatively, if the answer is "NO", the process may proceed to step S640 and may use the stored decision model to obtain a decision result and may add the obtained decision result to the partition decision table. Step S650 may then be performed.

It should be noted that FIG. 6 is an example of a decision-making process in some embodiments in which discrete coding is performed and static storage or dynamic storage is used as described above. However, this is merely an example, and is not a limitation of the present disclosure. In some embodiments in which discrete coding is not performed, the process of making a decision using the partition decision table may be different. For example, the partition to which the input belongs may be directly determined according to the input. The partition decision table may then be queried to obtain the decision result. In the case that the decision result is not obtained by querying the partition decision table, but the decision model is stored, the stored decision model may be used to obtain the decision result. Alternatively, a feedback may be provided to indicate that the decision result cannot be given, etc.

According to the speed planning method of the embodiment of the present disclosure, when the decision result of the determined partition is determined as not to conform to an expectation, the partition decision result of the partition can be quickly adjusted. The method does not need to modify the training sample set or adjust the training parameters for retraining. Nor does the method need to adjust the parameters of the trained model. Rather, the method only needs to modify the decision result of the corresponding partition on the partition decision table to ensure that the adjustment is limited to this partition without affecting the decision results on other partitions.

In particular, methods for adjusting the partition decision result may include adjusting the partition decision result of the partition based on experience, by learning the partition using a machine learning method, etc. For example, when a current speed is 10 km/h, a distance from the front vehicle is 200 m, a speed relative to a front vehicle is 5 km/h, a maximum speed is 30 km/h and the speed control is abnormal, the response of an experienced driver in this case can be referred to and converted into a corresponding decision result, and the decision result is stored in a decision entry corresponding to the interval to which the input belongs. Data can also be collected from many drivers while driving, and all decision results corresponding to the input space may be collected to obtain a desired decision result by induction or simple machine learning.

Figure 7:
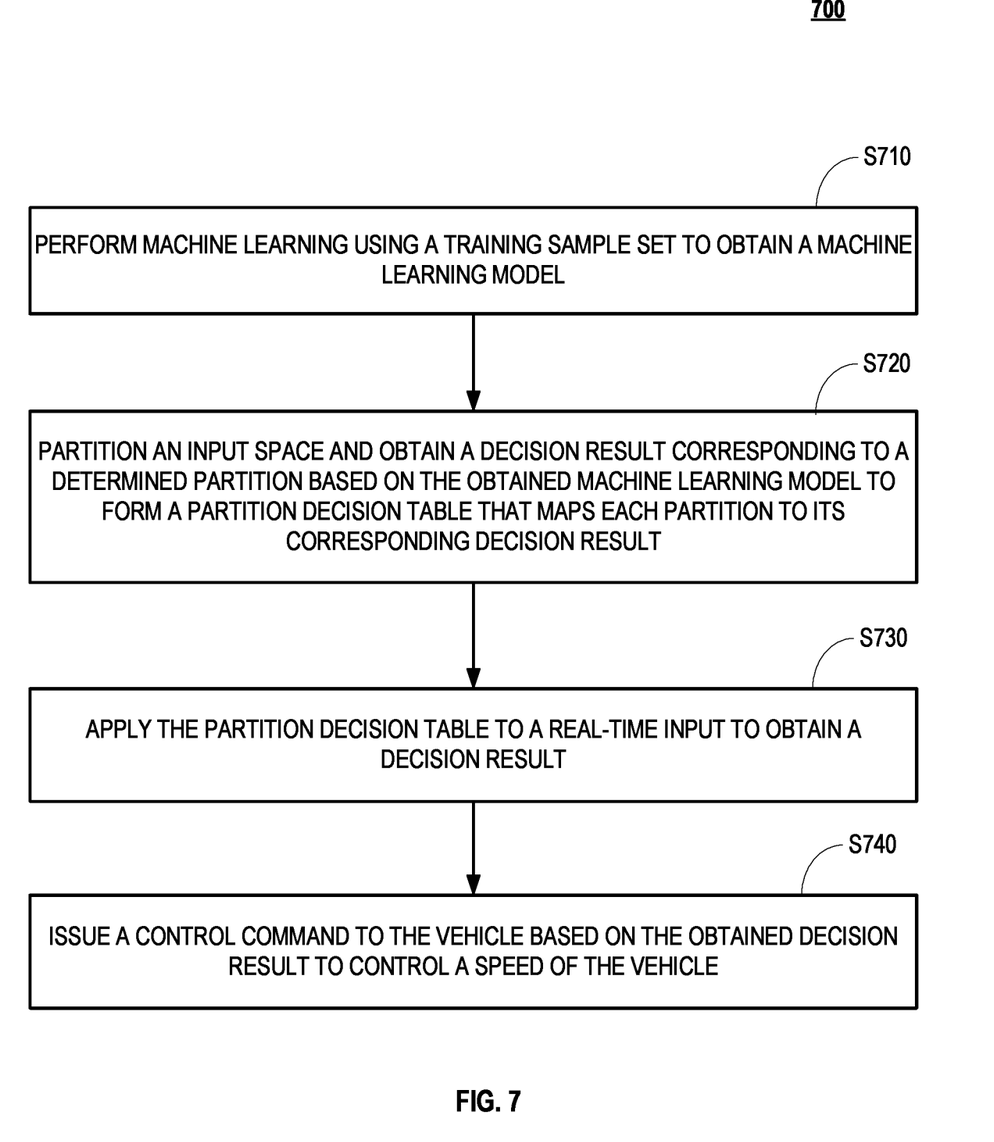
FIG. 7 shows a flowchart of a speed planning control method 700 including a real-time control step according to an embodiment of the present disclosure.

In one example, after the decision result is obtained, a real-time control step is performed to issue a control command to the vehicle based on the obtained decision result, thereby controlling the speed of the vehicle. FIG. 7 shows a flowchart of a speed planning control method 700 including a real-time control step according to an embodiment of the present disclosure. Steps S710-S730 in FIG. 7 are similar to steps S110-S130 shown in FIG. 1, and the difference lies in adding a real-time control step S740, that is, issuing a control command to the vehicle based on the obtained decision result to control the speed of the vehicle.

It should be noted that the real-time control is executed here according to the speed planning decision result, which is not an exclusive control, but can be combined with other control strategies (e.g., steering control, etc.) of automatic driving to comprehensively control the vehicle.

According to a preferred embodiment of the present disclosure, when the decision results of one or more certain partitions are found not to conform to the exception, the partition decision results of the certain partitions may be adjusted and the number of partitions may be determined after the partition decision results of the partitions are adjusted. When the number of the partitions exceeds a predetermined threshold, the overall training step and the machine learning may be re-executed to obtain a new decision model, and partitioning may be performed again. That is, step S110 to step S130 shown in FIG. 1, i.e., the machine learning step and the partition decision table obtaining step, can be re-executed based on the feedback results. When the machine learning is re-executed, better machine learning can be obtained by modifying the training parameters, adding corresponding training cases and other methods based on the feedback of the application decision result.

According to another embodiment of the present disclosure, a speed planning apparatus for automatic driving of a vehicle is provided. The speed planning apparatus, as will be described below in conjunction with FIG. 8, including a machine learning unit 810, a partition decision table obtaining unit 820, and a real-time decision-making unit 830. Optionally, a real-time control unit 830 may also be included.

Figure 8:
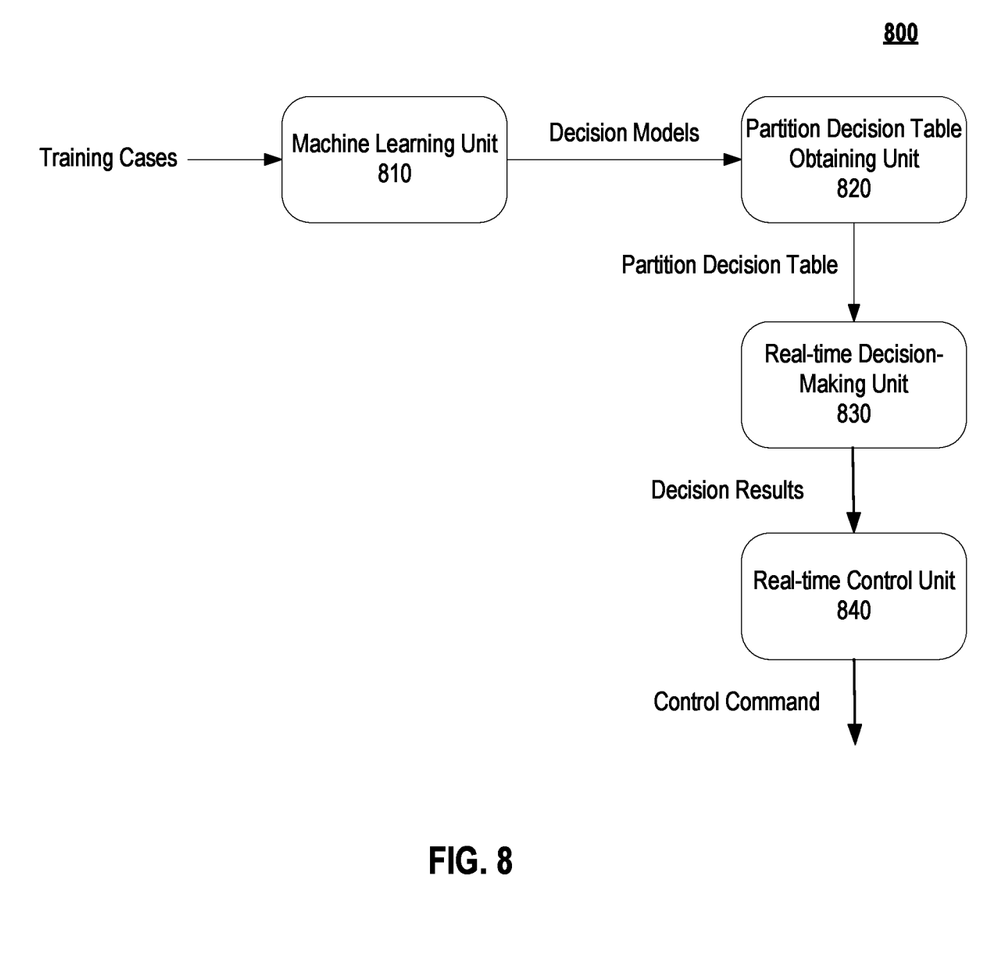
FIG. 8 is a block diagram of a speed planning apparatus 800 for automatic driving of a vehicle according to an embodiment of the present disclosure.

The machine learning unit 810 may be configured to perform machine learning using a set of training samples to obtain a machine learning model. Each of the training samples may be represented by a multi-dimensional feature vector feature vector forming an input space and a decision result forming an output space. Each dimension of the multi-dimensional feature vector may be a variable describing a state of the vehicle at a particular moment. The variable may be related to speed planning. The decision result may indicate an expected speed at a next moment and/or a control parameter value related to speed control.

The partition decision table obtaining unit 820 may be configured to partition the input space, and obtain a decision result corresponding to a determined partition based on the obtained machine learning model to form a partition decision table. The partition decision table may map each of the partitions to its corresponding decision result.

The real-time decision-making unit 830 may be configured to obtain each dimensional feature vector of the vehicle in real-time while the vehicle is driving as an input feature, determine an input partition to which the input feature belongs, and query the partition decision table based on the determined partition to obtain a corresponding decision result.

The real-time control unit 840 is configured to issue a control command to the vehicle based on the obtained decision result to control the speed of the vehicle.

In one example, the speed planning apparatus may further include a local partition decision adjustment unit configured to adjust the partition decision result of the partition when the decision result of the determined partition is determined as not conforming to the expectation.

When the local partition decision adjustment unit adjusts the partition decision content of the partition, the partition decision content of the partition may be adjusted according to experience. Alternatively, the partition may be learned by a machine learning method, and the partition decision result of the partition may be adjusted.

In one example, the speed planning apparatus further includes a discrete coding unit configured to perform discrete coding on the training samples and the input feature at the real-time decision stage.

The final code space is usually small, e.g., in the speed planning and control when an automatic cruise system is implemented, the input may have only four dimensions: a current speed, a distance from a front vehicle, a relative speed with respect to the front vehicle, and a maximum speed. The discrete coding method preferably used by the discrete coding unit is tiling coding. The tiling coding having only one tiling codes each input dimension, and divides each input dimension into preferred 7-13 intervals to well meet the speed decision requirements of automatic driving.

In some extreme cases (e.g., a great number of input dimensions or a large discretized code output space), the final code space may exceed the storage space of the computer, so the partition decision table obtaining unit 820 is also configured to calculate a size of a space corresponding to a discrete coding result obtained by the discrete coding method.

When the size of the space of the discrete coding result obtained by the partition decision table obtaining unit 820 using the discrete coding method is greater than the determined threshold, a dynamic storage method may be used to store the partition decision table. The input of the training space is traversed. The output result of the corresponding decision model is stored, and the trained decision model is also stored for backup.

Correspondingly, the real-time decision-making unit 830 of the present disclosure is configured to perform discrete coding on the input feature using the discrete coding method, and then use the obtained discrete coding result as an index of the partition decision table. Since the partition decision table is stored using the dynamic storage method, if the decision result of the discrete coding result is stored in the partition decision table, the decision result may be directly obtained from the partition decision table. If the decision result of the discrete coding result is not stored in the partition decision table, the stored decision model may be used to obtain a decision result. The obtained decision result may be added to the partition decision table.

When the space of the discrete coding result discrete coding calculated by the partition decision table obtaining unit 820 using the discrete coding method is smaller than the determined threshold, a static storage method may be used to store the partition decision table. All the code spaces may be traversed. The output result of the decision model may be stored.

Correspondingly, the real-time decision-making unit 830 of the present disclosure is configured to perform discrete coding on the input feature using the discrete coding method, and then use the obtained discrete coding result as an index of the partition decision table. Since the partition decision table is stored using the static storage method, the decision result stored in the partition decision table can be directly obtained.

The machine learning method used by the machine learning unit 810 may be a supervised learning method, an unsupervised learning method, or a reinforcement learning method.

The partition decision table obtaining unit 820 is configured such that two inputs are regarded as belonging to the same partition as long as the final discrete codes of the two inputs are identical.

The discrete coding method used by the discrete coding unit may be selected from various coarse coding methods, such as tile coding.

In one example, the speed planning apparatus 800 may further include a feedback unit configured to determine the number of partitions of which the partition decision results are adjusted after the partition decision results of the partitions are adjusted when the decision results of some partitions are determined as not conforming to the expectation, and trigger the machine learning unit 810 and the partition decision table obtaining unit 820 to perform the machine learning step and the partition decision table obtaining step again when the number of the partitions exceeds a predetermined threshold.

Another embodiment of the present disclosure also provides an apparatus for calculating speed planning of automatic driving of a vehicle, including a storage component and a processor, wherein the storage component stores a computer executable instruction set, and when the computer executable instruction set is executed by the processor, the following steps may be performed: a machine learning step, comprising performing machine learning using a set of training samples to obtain a machine learning model, wherein each of the training samples is represented by a multi-dimensional feature vector forming an input space and a decision result forming an output space, wherein each dimension of the multi-dimensional feature vector is a variable describing a state of the vehicle at a particular moment and related to speed planning, and wherein the decision result indicates an expected speed at a next moment and/or a control parameter value related to speed control; a partition decision table obtaining step, comprising: partitioning the input space, and obtaining a decision result corresponding to a determined partition based on the obtained machine learning model to form a partition decision table that maps each partition to its corresponding decision result; and a real-time decision-making step, comprising: obtaining each dimensional feature vector of the vehicle while driving in real time as an input feature, determining an input partition to which the input feature belongs, and querying the partition decision table based on the determined partition to obtain a decision result corresponding to the input feature.

Optionally, when the computer executable instruction set is executed by the processor, the following step may also be performed: a real-time control step, comprising: issuing a control command to the vehicle based on the obtained decision result to control the speed of the vehicle.

It should be noted that the vehicle in the description should be understood in a broad sense, including various large, medium and small vehicles, water vehicles, etc.

It should be noted that the steps of the method may be performed locally in the vehicle, in the cloud, or both locally and in the cloud, and the relevant data may also be stored locally, or in the cloud, or both locally and in the cloud.

The embodiments of the present disclosure have been described above, which are examples and are not exhaustive, and are not limited to the disclosure. Many modifications and changes may be apparent to those skilled in the art without departing from the scope and spirit of the embodiments described. Therefore, the scope of the present disclosure shall be defined by the scope of the claims.

The invention claimed is:

1. A method, comprising:
performing machine learning using a set of training samples to obtain a machine learning model, wherein the training samples comprise a plurality of multi-dimensional feature vectors forming an input space and a plurality of training decision results forming an output space, wherein each of the multi-dimensional feature vectors comprises a variable describing a vehicle state at a particular moment, and wherein each of the training decision results indicates at least one of an expected speed at a next moment or a control parameter value related to speed control;
constructing, by a processor, a partition decision table based on the obtained machine learning model and a plurality of partitions of the input space, wherein the partition decision table maps each of the plurality of partitions to one of a plurality of partition decision results, the plurality of partition decision results including a first partition decision result, the first partition decision result corresponding to a first partition among the plurality of partitions, the plurality of partitions including one or more other partitions;
adjusting the first partition decision result of the plurality of partition decision results, wherein the first partition decision result is adjusted separately from the performed machine learning and is adjusted independently from the obtained machine learning model and is adjusted in real-time while a vehicle is driving wherein the partition decision table maps the first partition to the adjusted first partition decision result, wherein the partition decision table maps the one or more other partitions to partition decision results unaffected by said adjusting the first partition decision result;
querying the partition decision table, which maps the first partition to the adjusted first partition decision result and maps the one or more other partitions to the unaffected partition decision results, based on an input feature of the driving vehicle to obtain a corresponding decision result; and
issuing a control command to the driving vehicle based on the corresponding decision result to control a speed of the driving vehicle.

2. The method of claim 1, wherein the input feature represents at least one of a current speed, a distance from a front vehicle, a relative speed with respect to the front vehicle, or a maximum speed of the driving vehicle.

3. The method of claim 1, wherein constructing, by the processor, the partition decision table based on the plurality of partitions of the input space and the machine learning model comprises:
dividing the input space into the plurality of partitions;
obtaining the plurality of partition decision results using the machine learning model; and
storing each of the plurality of partition decision results in association with one of the plurality of partitions.

4. The method of claim 3, further comprising storing the machine learning model in association with the partition decision table.

5. The method of claim 3, wherein the first partition decision result of the plurality of partition decision results is adjusted in the partition decision table in response to determining that the first partition decision result of the plurality of partition decision results does not conform to an expectation.

6. The method of claim 5, further comprising:
in response to determining that a predetermined number of the plurality of partitions are to be adjusted, reconstructing the partition decision table.

7. The method of claim 3, further comprising:
performing discrete coding on the training samples to generate a first discrete coding result; and
dividing the input space into the plurality of partitions based on the first discrete coding result.

8. The method of claim 7, further comprising:
performing discrete coding on the input feature to generate a second discrete coding result, wherein querying the partition decision table based on the input feature to obtain the corresponding decision result comprises querying the partition decision table using the second discrete coding result.

9. The method of claim 8, further comprising:
in response to determining that a decision result corresponding to the second discrete coding result is stored in the partition decision table, retrieving the decision result corresponding to the second discrete coding result from the partition decision table.

10. The method of claim 8, further comprising:
in response to determining that a decision result corresponding to the second discrete coding result is not stored in the partition decision table, obtaining a decision result using a stored decision model; and
adding the obtained decision result to the partition decision table.

11. The method of claim 7, wherein partitioning the input space into the plurality of partitions based on the first discrete coding result comprises:
assigning a first training sample and a second training sample to one of the plurality of partitions in response to determining that the first training sample and the second training sample are encoded into the same coded data.

12. The method of claim 1, wherein querying the partition decision table based on the input feature to obtain the corresponding decision result comprises:
determining an input partition for the input feature; and
querying the partition decision table using the input partition.

13. An apparatus for speed planning, comprising:
a storage component, and
a processor coupled to the storage component to:
perform machine learning using a set of training samples to obtain a machine learning model, wherein the training samples comprise a plurality of multi-dimensional feature vectors forming an input space and a plurality of training decision results forming an output space, wherein each of the multi-dimensional feature vectors comprises a variable describing a vehicle state at a particular moment, and wherein each of the training decision results indicates at least one of an expected speed at a next moment or a control parameter value related to speed control;
construct a partition decision table based on the obtained machine learning model and a plurality of partitions of the input space, wherein the partition decision table maps each of the plurality of partitions to one of a plurality of partition decision results, the plurality of partition decision results including a first partition decision result, the first partition decision result corresponding to a first partition among the plurality of partitions, the plurality of partitions including one or more other partitions;
adjust the first partition decision result of the plurality of partition decision results, wherein the first partition decision result is adjusted separately from the performed machine learning and is adjusted independently from the obtained machine learning model and is adjusted in real-time while a vehicle is driving, wherein the partition decision table maps the first partition to the adjusted first partition decision result, wherein the partition decision table maps the one or more other partitions to partition decision results unaffected by said adjusting the first partition decision result;
query the partition decision table, which maps the first partition to the adjusted first partition decision result and maps the one or more other partitions to the unaffected partition decision results, based on an input feature of the driving vehicle to obtain a corresponding decision result; and
issue a control command to the driving vehicle based on the corresponding decision result to control a speed of the driving vehicle.

14. The apparatus of claim 13, wherein the input feature represents at least one of a current speed, a distance from a front vehicle, a relative speed with respect to the front vehicle, or a maximum speed of the driving vehicle.

15. The apparatus of claim 13, wherein to construct the partition decision table based on the plurality of partitions of the input space and the machine learning model, the processor is further to:
divide the input space into the plurality of partitions;
obtain the plurality of partition decision results using the machine learning model; and
store each of the plurality of partition decision results in association with one of the plurality of partitions.

16. The apparatus of claim 15, wherein the processor is further to:
perform discrete coding on the training samples to generate a first discrete coding result; and
divide the input space into the plurality of partitions based on the first discrete coding result.

17. The apparatus of claim 16, wherein the processor is further to:
perform discrete coding on the input feature to generate a second discrete coding result;
determine an input partition for the input feature based on the second discrete coding result; and
query the partition decision table using the input partition.

18. The apparatus of claim 17, wherein the processor is further to:
in response to determining that a decision result corresponding to the second discrete coding result is stored in the partition decision table, retrieve the decision result corresponding to the second discrete coding result from the partition decision table.

19. The apparatus of claim 17, wherein the processor is further to:
in response to determining that a decision result corresponding to the second discrete coding result is not stored in the partition decision table, obtain a decision result using a stored decision model; and
add the obtained decision result to the partition decision table.

20. A non-transitory machine-readable storage medium including instructions that, when executed by a processor, cause the processor to:
perform machine learning using a set of training samples to obtain a machine learning model, wherein the training samples comprise a plurality of multi-dimensional feature vectors forming an input space and a plurality of training decision results forming an output space, wherein each of the multi-dimensional feature vectors comprises a variable describing a vehicle state at a particular moment, and wherein each of the training decision results indicates at least one of an expected speed at a next moment or a control parameter value related to speed control;
construct a partition decision table based on the obtained machine learning model and a plurality of partitions of the input space, wherein the partition decision table maps each of the plurality of partitions to one of a plurality of partition decision results, the plurality of partition decision results including a first partition decision result, the first partition decision result corresponding to a first partition among the plurality of partitions, the plurality of partitions including one or more other partitions;
adjust the first partition decision result of the plurality of partition decision results, wherein the first partition decision result is adjusted separately from the performed machine learning and is adjusted independently from the obtained machine learning model and is adjusted in real-time while a vehicle is driving, wherein the partition decision table maps the first partition to the adjusted first partition decision result, wherein the partition decision table maps the one or more other partitions to partition decision results unaffected by said adjusting the first partition decision result;
query the partition decision table, which maps the first partition to the adjusted first partition decision result and maps the one or more other partitions to the unaffected partition decision results, based on an input feature of the driving vehicle to obtain a corresponding decision result; and
issue a control command to the driving vehicle based on the corresponding decision result to control a speed of the driving vehicle.

\* \* \* \* \*